US012371635B2

(12) United States Patent
Burgess et al.

(10) Patent No.: US 12,371,635 B2
(45) Date of Patent: *Jul. 29, 2025

(54) LAUNDRY COMPOSITION

(71) Applicant: Conopco, Inc., Englewood Cliffs, NJ (US)

(72) Inventors: Karl Burgess, Wirral (GB); Andrew Peter Rose, Wirral (GB)

(73) Assignee: Conopco, Inc., Englewood Cliffs, NJ (US)

( * ) Notice: Subject to any disclaimer, the term of this patent is extended or adjusted under 35 U.S.C. 154(b) by 641 days.

This patent is subject to a terminal disclaimer.

(21) Appl. No.: 17/610,034

(22) PCT Filed: May 15, 2020

(86) PCT No.: PCT/EP2020/063617

§ 371 (c)(1),
(2) Date: Nov. 9, 2021

(87) PCT Pub. No.: WO2020/229661

PCT Pub. Date: Nov. 19, 2020

(65) Prior Publication Data

US 2022/0220422 A1 Jul. 14, 2022

(30) Foreign Application Priority Data

May 16, 2019 (EP) .................................... 19174840

(51) Int. Cl.

| | |
|---|---|
| ***C11D 11/00*** | (2006.01) |
| ***C11D 1/72*** | (2006.01) |
| ***C11D 3/00*** | (2006.01) |
| ***C11D 3/50*** | (2006.01) |

(52) U.S. Cl.

CPC ................ *C11D 1/72* (2013.01); *C11D 3/001* (2013.01); *C11D 3/0036* (2013.01); *C11D 3/505* (2013.01); *C11D 2111/12* (2024.01)

(58) Field of Classification Search

CPC ....... C11D 11/0017; C11D 1/72; C11D 3/001; C11D 3/505; C11D 3/0036

See application file for complete search history.

(56) References Cited

U.S. PATENT DOCUMENTS

| | | | | | |
|---|---|---|---|---|---|
| 3,893,929 | A * | 7/1975 | Basadur | C11D 3/0036 | 510/528 |
| 3,959,230 | A * | 5/1976 | Hays | C11D 3/0036 | 528/297 |
| 4,435,307 | A | 3/1984 | Barbesgaard et al. | | |
| 4,702,857 | A * | 10/1987 | Gosselink | C08G 63/688 | 510/528 |
| 4,711,730 | A * | 12/1987 | Gosselink | C11D 3/001 | 510/517 |
| 4,721,580 | A * | 1/1988 | Gosselink | C11D 3/0036 | 510/528 |
| 4,746,456 | A | 5/1988 | Kud et al. | | |
| 4,760,025 | A | 7/1988 | Estell et al. | | |
| 4,861,512 | A | 8/1989 | Gosselink | | |
| 4,877,896 | A | 10/1989 | Maldonado et al. | | |
| 4,956,447 | A | 9/1990 | Gosselink et al. | | |
| 4,968,451 | A * | 11/1990 | Scheibel | C08G 63/918 | 510/528 |
| 5,427,936 | A | 6/1995 | Moeller et al. | | |
| 5,574,179 | A | 11/1996 | Wahl et al. | | |
| 5,648,263 | A | 7/1997 | Schulein et al. | | |
| 5,679,630 | A | 10/1997 | Baeck et al. | | |
| 5,691,178 | A | 11/1997 | Schulein et al. | | |
| 5,776,757 | A | 7/1998 | Schulein et al. | | |
| 5,789,373 | A | 8/1998 | Baker et al. | | |
| 5,904,735 | A * | 5/1999 | Gutierrez | C11D 3/3723 | 510/320 |
| 6,136,769 | A * | 10/2000 | Asano | C11D 3/0063 | 510/330 |
| 6,312,936 | B1 | 11/2001 | Poulose et al. | | |
| 7,262,042 | B2 | 8/2007 | Weber et al. | | |
| 10,093,884 | B2 | 10/2018 | Falk et al. | | |
| 2008/0033106 | A1* | 2/2008 | Koroskenyi | C11D 3/3776 | 528/392 |
| 2008/0262109 | A1* | 10/2008 | Orlich | B01F 23/51 | 426/531 |
| 2009/0036641 | A1 | 2/2009 | Lang et al. | | |
| 2010/0144579 | A1 | 6/2010 | Volkel et al. | | |
| 2011/0245141 | A1* | 10/2011 | Gizaw | C11D 3/3773 | 510/516 |
| 2013/0200290 | A1* | 8/2013 | Morschhaeuser | C08G 63/672 | 510/528 |

(Continued)

FOREIGN PATENT DOCUMENTS

| | | |
|---|---|---|
| CN | 1152335 A | 6/1997 |
| CN | 1268164 A | 9/2000 |

(Continued)

OTHER PUBLICATIONS

Notice of Opposition issued in European Patent Application No. EP2072159.2 dated Jan. 19, 2024.
Notice of Opposition issued in European Patent Application No. EP2072159.2 dated Jan. 23, 2024.
Sokalan CP 5, BASF Personal Care—Ross Organic an Azelis company dated Jan. 10, 2024.
Sokalan HP 22, Technical Information—Specialty Chemicals dated Sep. 1991, pp. 1-9 (Germany).
Search Report and Written Opinion in EP19174834; Oct. 30, 2019.
Search Report and Written Opinion in EP19174840; Nov. 26, 2019.
Search Report and Written Opinion in EP19174844; Nov. 5, 2019.
Search Report and Written Opinion in PCTEP2020063325; Jul. 23, 2020.

(Continued)

*Primary Examiner* — Mark Eashoo
*Assistant Examiner* — M. Reza Asdjodi
(74) *Attorney, Agent, or Firm* — Carter, DeLuca & Farrell, LLP; George Likourezos; Bret P. Shapiro

(57) ABSTRACT

The present invention relates to an ancillary laundry composition comprising: a. Soil release polymer; b. 0.5 to 20 wt. % free perfume; c. 0.5-12 wt. % non-ionic surfactant; and d. Water.

6 Claims, No Drawings

(56) References Cited

U.S. PATENT DOCUMENTS

| | | | | |
|---|---|---|---|---|
| 2013/0295032 | A1* | 11/2013 | Yeung | C08F 297/02 514/772.1 |
| 2015/0210961 | A1* | 7/2015 | Carswell | C11D 3/30 510/342 |
| 2016/0074311 | A1* | 3/2016 | Massey-Brooker | A61Q 19/00 424/70.13 |
| 2016/0244698 | A1* | 8/2016 | Schubert | C11D 3/38609 |
| 2017/0044471 | A1* | 2/2017 | Coope-Epstein | C11D 1/825 |
| 2017/0283744 | A1 | 10/2017 | Antir | |
| 2017/0335245 | A1* | 11/2017 | Burgess | C11D 3/0021 |
| 2018/0105768 | A1 | 4/2018 | Falk et al. | |
| 2019/0241840 | A1* | 8/2019 | Burgess | C11D 3/227 |
| 2019/0376006 | A1* | 12/2019 | Crossman | C11D 3/505 |
| 2019/0376007 | A1* | 12/2019 | Crossman | C11D 3/373 |
| 2019/0376009 | A1* | 12/2019 | Brennan | C11D 3/37 |
| 2019/0390142 | A1 | 12/2019 | Fossum et al. | |
| 2020/0407664 | A1* | 12/2020 | Crossman | C11D 3/222 |
| 2022/0220422 | A1* | 7/2022 | Burgess | C11D 3/50 |
| 2023/0323251 | A1* | 10/2023 | Burgess | C11D 1/83 510/349 |

FOREIGN PATENT DOCUMENTS

| | | | | |
|---|---|---|---|---|
| CN | 1329666 | A | 1/2002 | |
| CN | 1134169 | C | 1/2004 | |
| CN | 101600786 | A | 12/2009 | |
| CN | 108315102 | A | 7/2018 | |
| CN | 108779416 | A | 11/2018 | |
| EP | 0218272 | A1 | 4/1987 | |
| EP | 0219048 | A2 | 4/1987 | |
| EP | 0237119 | | 9/1987 | |
| EP | 0258068 | A2 | 3/1988 | |
| EP | 0305216 | A1 | 3/1989 | |
| EP | 0331376 | A2 | 9/1989 | |
| EP | 0260105 | A3 | 2/1990 | |
| EP | 0407225 | A1 | 1/1991 | |
| EP | 0598973 | A1 | 6/1994 | |
| EP | 0679714 | | 11/1995 | |
| EP | 0686691 | A1 | 12/1995 | |
| EP | 0841391 | | 5/1998 | |
| EP | 3101102 | | 12/2016 | |
| EP | 3272846 | | 1/2018 | |
| EP | 3299445 | A | 3/2018 | |
| EP | 3814469 | A1 | 5/2021 | |
| GB | 1296839 | A | 11/1972 | |
| GB | 1372034 | A | 10/1974 | |
| JP | 2008519900 | A | 6/2008 | |
| JP | 6203812 | B2 | 9/2017 | |
| WO | 8906270 | A1 | 7/1989 | |
| WO | 8906279 | A1 | 7/1989 | |
| WO | 8909259 | A1 | 10/1989 | |
| WO | 9116422 | A1 | 10/1991 | |
| WO | 9205249 | A1 | 4/1992 | |
| WO | 9219708 | A1 | 11/1992 | |
| WO | 9219709 | A1 | 11/1992 | |
| WO | 9318140 | A1 | 9/1993 | |
| WO | 9324618 | A1 | 12/1993 | |
| WO | 9401541 | A1 | 1/1994 | |
| WO | 9425578 | A1 | 11/1994 | |
| WO | 9425583 | A1 | 11/1994 | |
| WO | 9505442 | A1 | 2/1995 | |
| WO | 9506720 | A1 | 3/1995 | |
| WO | 9510602 | A1 | 4/1995 | |
| WO | 9514783 | A1 | 6/1995 | |
| WO | 9522615 | A1 | 8/1995 | |
| WO | 9526397 | A1 | 10/1995 | |
| WO | 9530744 | A2 | 11/1995 | |
| WO | 9535381 | A1 | 12/1995 | |
| WO | 9600292 | A1 | 1/1996 | |
| WO | 9612012 | A1 | 4/1996 | |
| WO | 9613580 | A1 | 5/1996 | |
| WO | 9627002 | A1 | 9/1996 | |
| WO | 9629397 | A1 | 9/1996 | |
| WO | 9704079 | A1 | 2/1997 | |
| WO | 9707202 | A1 | 2/1997 | |
| WO | 9812307 | A1 | 3/1998 | |
| WO | 9815257 | A1 | 4/1998 | |
| WO | 9927059 | A1 | 6/1999 | |
| WO | 0060060 | A2 | 10/2000 | |
| WO | 0060063 | A1 | 10/2000 | |
| WO | 0116285 | A2 | 3/2001 | |
| WO | 0216547 | A2 | 2/2002 | |
| WO | 0226024 | A1 | 4/2002 | |
| WO | 2005040372 | A1 | 5/2005 | |
| WO | 2005052146 | A2 | 6/2005 | |
| WO | 2005052161 | A2 | 6/2005 | |
| WO | 2006024612 | A1 | 3/2006 | |
| WO | 2006055787 | A1 | 5/2006 | |
| WO | 2007079850 | A1 | 7/2007 | |
| WO | 2008090091 | A1 | 7/2008 | |
| WO | 2009021867 | A2 | 2/2009 | |
| WO | 2009087524 | A1 | 7/2009 | |
| WO | 2009090576 | A3 | 9/2009 | |
| WO | 2009107091 | A2 | 9/2009 | |
| WO | 2009111258 | A2 | 9/2009 | |
| WO | 2009148983 | A1 | 12/2009 | |
| WO | WO2010072627 | | 7/2010 | |
| WO | WO2011120799 | | 10/2011 | |
| WO | WO-2012136427 | A1 * | 10/2012 | C11D 11/0017 |
| WO | 2013142486 | A1 | 9/2013 | |
| WO | WO2015078766 | | 6/2015 | |
| WO | 2016005271 | A1 | 1/2016 | |
| WO | WO2016041679 | | 3/2016 | |
| WO | WO17174251 | | 6/2017 | |
| WO | WO-2017102402 | A1 * | 6/2017 | |
| WO | 2017174358 | A1 | 10/2017 | |
| WO | WO17102402 | | 10/2017 | |
| WO | WO-2017174251 | A1 * | 10/2017 | C11D 1/83 |
| WO | 2018145897 | A1 | 8/2018 | |
| WO | WO2019166477 | | 9/2019 | |
| WO | 2020005879 | A1 | 1/2020 | |
| WO | 2020229535 | A1 | 11/2020 | |

OTHER PUBLICATIONS

Search Report and Written Opinion in PCTEP2020061718; Aug. 13, 2020.

Search Report and Written Opinion of PCTEP2020063617; Aug. 13, 2020.

IPRP2 in PCTEP2020063325; May 3, 2021.

Co-pending U.S. Appl. No. 17/610,023, filed Nov. 9, 2021 entitled Laundry Composition.

Co-pending U.S. Appl. No. 17/610,079, filed Nov. 9, 2021 entitled Laundry Composition.

International Preliminary Report on Patentability issued in International Patent Application No. PCT/EP202/0061718 dated Nov. 25, 2021.

International Preliminary Report on Patentability issued in Internattional Patent Application No. PCT/EP2020/063617 dated Nov. 25, 2021.

Notice of Opposition issued in European Patent Application No. EP20724868, dated Dec. 15, 2023 (10 pages).

* cited by examiner

LAUNDRY COMPOSITION

FIELD OF THE INVENTION

The present invention relates to an ancillary laundry composition providing improved perfuming to fabrics.

BACKGROUND OF THE INVENTION

Perfumes are an important aspect of the laundry process for consumers. Fragrances can be an indication to the consumer that their washing is clean or simply provide a pleasurable experience. Accordingly, may products comprise perfumes. However, this presents a problem in that different consumers like different fragrances and different intensities of perfumes. Consumers are known to over or under dose a product to achieve the desired level of perfume. However, this has a negative impact on the effectiveness of the primary purpose of the laundry product (cleaning or softening).

Accordingly, ancillary laundry compositions have been developed, to allow the consumer to select their desired fragrance and add this to the laundry at their desired dosing level. However, there is a need to improve the efficacy of these ancillary laundry products.

SUMMARY OF THE INVENTION

One aspect of the present invention relates to an ancillary laundry composition comprising:

a. Soil release polymer;
b. 0.5 to 20 wt. % free perfume;
c. 0.5-12 wt. % non-ionic surfactant; and
d. Water.

A second aspect of the present invention relates to a method of improving the perfume intensity of a dry fabric comprising the steps of:

a. adding an ancillary laundry composition as described herein into the wash or rinse stage of the laundry process.

A third aspect of the present invention relates a method of reducing malodour of synthetic fabrics comprising the steps of:

a. adding an ancillary laundry composition as described herein into the wash or rinse stage of the laundry process.

A forth aspect of the present invention relates to a use of an ancillary laundry composition as described herein, to improve the perfume intensity of a dry fabric.

A fifth aspect of the present invention relates to a use of an ancillary laundry composition as described herein, to reduce malodour on synthetic fabrics.

DETAILED DESCRIPTION OF THE INVENTION

These and other aspects, features and advantages will become apparent to those of ordinary skill in the art from a reading of the following detailed description and the appended claims. For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

The term 'ancillary laundry composition' is used to refer to a specific format of laundry product. This is a liquid product which is intended to be used in addition to a laundry detergent and/or the fabric conditioner to provide an additional or improved benefit to the materials in the wash or rinse cycle. However, the formulations may also be used instead of a fabric conditioner formulation. Ancillary laundry compositions may also be referred to as a serum.

This particular format provides an improved benefit delivery. It also provides consumers with a simple additive product which can be used in addition to their usual fabric conditioner.

Soil Release Polymer

The compositions of the present invention comprise soil release polymers. Soil release polymers provide multiple benefits to the present invention. Soil release polymers improve perfume intensity of the dry fabrics. Without wishing to be bound by theory, it is believed that this is due to improved hedonics. Soil release polymers also reduce malodour of synthetic fabrics such as polyesters. The malodour reduction can contribute to the improved perfume intensity, since the perfume is not required to mask the malodour.

Suitable soil release polymers can be synthesised by conventional techniques well-known the skilled person, such as those described in US 2013/0200290.

Soil release polymers may be present at a level selected from: less than 30%, less than 20%, and less than 10%, by weight of the laundry composition. Soil release polymers may be present at a level selected from: more than 0.5%, preferably more than 1%, by weight of the composition. Suitably Soil release polymers is present in the composition in an amount selected from the range of from about 0.5% to about 30%, preferably from about 0.5% to about 20%, more preferably from about 1% to about 10%, by weight of the composition.

The soil release polymer has one or more fabric-binding regions, to provide fabric substantively. For example, the soil release polymer may include a fabric-binding region capped by one or more hydrophilic regions. Typically, the fabric-binding region forms the central portion of the molecule (the "midblock") and is capped by hydrophilic groups. The anionic substituents are provided on the fabric-binding region and/or on the end cap, since these disrupt surfactant interaction with the soil release polymer.

The weight average molecular weight of the polymeric soil release polymer may be at least 1,000, at least 2,000, at least 5,000, at least 10,000, at least 15,000, at least 20,000 or at least 25,000. The upper limit for the weight average molecular weight may be, for example, 100,000; 75,000; 60,000; 55,000; 50,000; 40,000 or 30,000. For example, the weight average molecular weight may be between about 5,000 to about 50,000, such as between about 1,200 to 12,000.

Preferably the soil release polymers of the present invention are polymers according to the following generic formula:

$$X_1—R_1—Z—R_2—X_2 \quad \text{Formula (I)}$$

Wherein:

$X_1$ and $X_2$ are independently capping moieties $R_1$ and $R_1$ are independently one or more nonionic hydrophilic blocks Z is one or more anionic hydrophobic blocks $X_1$ and $X_2$ are independently, preferably, alkyl groups, more preferably $C_{1-4}$ alkyl branched or unbranched moieties.

$R_1$ and $R_1$ are independently, preferably blocks consisting of one or more nonionic hydrophilic components selected from:

(i) polyoxyethylene segments with a degree of polymerization of at least 2, preferably from 3 to about 150, more preferably from 6 to about 100 or (ii) polyoxypropylene segments with a degree of polymerization of at least 2, or (iii) oxypropylene or polyoxypropylene segments with a degree of polymerization of from 2 to 10, wherein said hydrophile segment does not encompass any oxypropylene unit unless it is bonded to adjacent moieties at each end by ether linkages, or (iv) a mixture of oxyalkylene units comprising oxyethylene and from 1 to about 30 oxypropylene units wherein said mixture contains a sufficient amount of oxyethylene units such that the hydrophile component has hydrophilicity great enough to increase the hydrophilicity of conventional polyester synthetic fiber surfaces upon deposit of the soil release agent on such surface, said hydrophile segments preferably comprising at least about 25% oxyethylene units and more preferably, especially for such components having about 20 to 30 oxypropylene units, at least about 50% oxyethylene units; or (v) oxypropylene and/or polyoxypropylene segments in the terminal positions of the polymer chain.

Z preferably consists of one or more anionic hydrophobic components selected from:

(i) $C_3$ oxyalkylene terephthalate segments, wherein, if said hydrophobe components also comprise oxyethylene terephthalate, the ratio of oxyethylene terephthalate:$C_3$ oxyalkylene terephthalate units is about 2:1 or lower, where the terephthalate segments are at least partially sulphonated (ii) C4-C6 alkylene or oxy C4-C6 alkylene segments, or mixtures therein, preferably these segments include, but are not limited to, end-caps of polymeric soil release agents such as MO3 S(CH2)n OCH2 CH2 O—, where M is sodium and n is an integer from 4-6, as disclosed in U.S. Pat. No. 4,721,580, issued Jan. 26, 1988 to Gosselink, (iii) poly (vinyl ester) segments, preferably polyvinyl acetate), having a degree of polymerization of at least 2, or (iv) C1-C4 alkyl ether or C4 hydroxyalkyl ether substituents, or mixtures therein, wherein said substituents are present in the form of C1-C4 alkyl ether or C4 hydroxyalkyl ether cellulose derivatives, or mixtures therein, and such cellulose derivatives are amphiphilic, whereby they have a sufficient level of C1-C4 alkyl ether and/or C4 hydroxyalkyl ether units to deposit upon conventional polyester synthetic fiber surfaces and retain a sufficient level of hydroxyls, once adhered to such conventional synthetic fiber surface, to increase fiber surface hydrophilicity, or a combination of (a) and (b). preferably these segments include graft copolymers of poly (vinyl ester), e.g., C1-C6 vinyl esters, preferably poly(vinyl acetate) grafted onto polyalkylene oxide backbones, such as polyethylene oxide backbones. See European Patent Application 0 219 048, published Apr. 22, 1987 by Kud, et al. Commercially available soil release agents of this kind include the SOKALAN type of material, e.g., SOKALAN HP-22, available from BASF (West Germany).

(iv) isophthalate groups, such as a 1,4-phenylene moiety or a 1,3-phenylene moiety having 0 to 4 anionic substituents (such as carboxylate, phosphonate, phosphate or, preferably sulphonate), preferably 1,4-phenylene moiety having 0 to 4 anionic substituents.

Preferably, the Z is a polyester polymer or comprises a polyester copolymer region.

In one preferred example, the soil release polymer may be according to the following formula (II)

Formula (II)

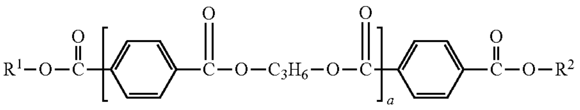

wherein $R^1$ and $R^2$ independently of one another are $X—(OC_2H_4)_n—(OC_3H_6)_m$ wherein X is $C_{1-4}$ alkyl, the $—(OC_2H_4)$ groups and the $—(OC_3H_6)$ groups are arranged blockwise and the block consisting of the $—(OC_3H_6)$ groups is bound to a COO group or are $HO—(C_3H_6)$, n is based on a molar average a number of from 12 to 120 and preferably of from 40 to 50, m is based on a molar average a number of from 1 to 10, and a is based on a molar average a number of from 4 to 9 and In the polymer of formula (I), "X" of $R^1$ and $R^2$ is preferably methyl.

In the polymer of formula (I), the $—(OC_3H_6)$ groups of $R^1$ and $R^2$ is preferably bound to a COO group.

In the polymer of formula (I), the variable "n" based on a molar average preferably is a number of from 40 to 50, more preferably is a number of from 43 to 47 and even more preferably is 44 to 46 and most preferably 45.

In the polymer of formula (I), the variable "m" based on a molar average preferably is a number of from 1 to 7, more preferably a number from 2 to 6.

In the polymer of formula (I), the variable "a" based on a molar average preferably is a number of from 5 to 8 and more preferably is a number of from 6 to 7.

The groups $—O—C_2H_4—$ in the structural units "$X—(OC_2H_{14})_n—(OC_3H_6)_m$" or "$H_3C—(OC_2H_4)_n$13 $(OC_3H_6)_m$" are of the formula $—O—CH_2—CH_2—$.

The groups $—O—C_3H_6—$ in the structural units indexed with "a", in the structural units "$X—(OC_2H_4)_n—(OC_3H_6)_m$" or "$H_3C—(OC_2H_4)_n—(OC_3H_6)_m$" and in the structural units $HO—(C_3H_6)$ are of the formula $—O—CH(CH_3)—CH_2—$ or $—O—CH_2—CH(CH_3)—$, i.e. are of the formula

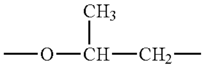 or 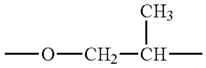 .

In one particularly preferred embodiment of the invention the polyesters of component A) of the inventive compositions are according to the following formula (I)

$R^1$ and $R^2$ independently of one another are $H_3C—(OC_2H_4)_n—(OC_3H_6)_m$ wherein the $—(OC_2H_4)$ groups and the $—(OC_3H_6)$ groups are arranged blockwise and the block consisting of the $—(OC_3H_6)$ groups is bound to a COO group, n is based on a molar average a number of from 44 to 46, m is based on a molar average 2, and a is based on a molar average a number of from 5 to 8.

And more preferably:

$R^1$ and $R^2$ independently of one another are $H_3C—(OC_2H_4)_n—(OC_3H_6)_m$ wherein the $—(OC_2H_4)$ groups and the $—(OC_3H_6)$ groups are arranged blockwise and the block consisting of the $—(OC_3H_6)$ groups is bound to a COO group, n is based on a molar average 45, m is based on a molar average 2, and a is based on a molar average a number of from 6 to 7 are especially preferred.

In an alternate particularly preferred embodiment of the invention the polyesters of component A) of the inventive compositions are according to the following formula (I)

$R^1$ and $R^2$ independently of one another are $H_3C—(OC_2H_4)_n—(OC_3H_6)_m$ wherein the $—(OC_2H_4)$ groups and the $—(OC_3H_6)$ groups are arranged blockwise and the block consisting of the $—(OC_3H_6)$ groups is bound to a COO group, n is based on a molar average a number of from 44 to 46, m is based on a molar average 5, and a is based on a molar average a number of from 5 to 8.

And more preferably:

$R^1$ and $R^2$ independently of one another are $H_3C—(OC_2H_4)_n—(OC_3H_6)_m$ wherein the $—(OC_2H_4)$ groups and the $—(OC_3H_6)$ groups are arranged blockwise and the block consisting of the $—(OC_3H_6)$ groups is bound to a COO group, n is based on a molar average 45, m is based on a molar average 5, and a is based on a molar average a number of from 6 to 7 are especially preferred.

In an alternative preferred example, the soil release polymers comprise copolymers having random blocks of ethylene terephthalate and polyethylene oxide (PEO) terephthalate. The molecular weight of this polymeric soil release agent is in the range of from about 25,000 to about 55,000. See U.S. Pat. No. 3,959,230 to Hays, issued May 25, 1976 and U.S. Pat. No. 3,893,929 to Basadur issued Jul. 8, 1975.

In an alternative preferred example, the soil release polymer is a polyester with repeat units of ethylene terephthalate units contains 10-15% by weight of ethylene terephthalate units together with 90-80% by weight of polyoxyethylene terephthalate units, derived from a polyoxyethylene glycol of average molecular weight 300-5,000. Examples of this polymer include the commercially available material ZELCON 5126 (from DuPont) and MILEASE T (from ICI). See also U.S. Pat. No. 4,702,857, issued Oct. 27, 1987 to Gosselink. Further examples of soil release polymers are terephthalic acid/glycol copolymers sold under the tradenames Texcare®, Repel-o-tex®, Gerol®, Marloquest® and, Cirrasol®.

In an alternative preferred example, the soil release polymer is a sulfonated product of a substantially linear ester oligomer comprised of an oligomeric ester backbone of terephthaloyl and oxyalkyleneoxy repeat units and terminal moieties covalently attached to the backbone. These soil release agents are described fully in U.S. Pat. No. 4,968,451, issued Nov. 6, 1990 to J. J. Scheibel and E. P. Gosselink. Other suitable polymeric soil release agents include the terephthalate polyesters of U.S. Pat. No. 4,711,730, issued Dec. 8, 1987 to Gosselink et al, the anionic end-capped oligomeric esters of U.S. Pat. No. 4,721,580, issued Jan. 26, 1988 to Gosselink, and the block polyester oligomeric compounds of U.S. Pat. No. 4,702,857, issued Oct. 27, 1987 to Gosselink.

Preferred polymeric soil release polymers also include the soil release agents of U.S. Pat. No. 4,877,896, issued Oct. 31, 1989 to Maldonado et al, which discloses anionic, especially sulfoarolyl, end-capped terephthalate esters.

In an alternative preferred example, the soil release agent is an oligomer with repeat units of terephthaloyl units, sulfoisoterephthaloyl units, oxyethyleneoxy and oxy-1,2-propylene units. The repeat units form the backbone of the oligomer and are preferably terminated with modified isethionate end-caps. A particularly preferred soil release agent of this type comprises about one sulfoisophthaloyl unit, 5 terephthaloyl units, oxyethyleneoxy and oxy-1,2-propyleneoxy units in a ratio of from about 1.7 to about 1.8, and two end-cap units of sodium 2-(2-hydroxyethoxy)-ethanesulfonate. Said soil release agent also comprises from about 0.5% to about 20%, by weight of the oligomer, of a crystalline-reducing stabilizer, preferably selected from the group consisting of xylene sulfonate, cumene sulfonate, toluene sulfonate, and mixtures thereof.

In an alternative preferred example, the soil release polymers comprise polymers of aromatic dicarboxylic acids and alkylene glycols (including polymers containing polyalkylene glycols). For example, the soil release polymer may comprise a fabric-binding region formed from aromatic dicarboxylic acid/ester monomer units. Most preferably, the anionic soil release polymer is formed from aromatic dicarboxylic acid/ester and alkylene glycol units (including polymers containing polyalkylene glycols), such as those described in US 2013/0200290. Examples of suitable polymers include Texcare® SRA 100N or Texcare® SRA 300F marketed by Clariant®.

In a more preferred example, the soil release polymer may be according to the following formula (III):

$$X\text{-}[(EO)_{q1}\text{-block-}(PO)_p]\text{-}[(A\text{-}G_1\text{-}A\text{-}G_2)n]^*B\text{-}G_1\text{-}B\text{-}[(PO)_p\text{-block-}(EO)_{q2}]\text{-}X \quad \text{Formula (III)}$$

wherein EO is ethylene oxide (CH2CH2O) and PO is at least 80 wt % propylene oxide (CH2CH(CH3)O), and preferably 100% PO units;

where p is a number from 0 to 60, and when p is not zero is preferably from 2 to 50, more preferably from 5 to 45, even more preferably from 6 to 40, yet more preferably from 7 to 40 and most preferably from 8 to 40, even from 11 to 35;

where q1 and q2 is a number from 6 to 120, preferably 18 to 80, most preferably 40 to 70, provided that q2 is greater than p and preferably q2 is at least 1.5 times as large as p;

where n is a number from 2 to 26; preferably 5 to 15;

Because they are an average, n, p, q1 and q2 are not necessarily a whole number for the polymer in bulk.

where X is a capping moiety, preferably selected from C1-4 alkyl, branched and unbranched;

A and B are selected from ester, amide and urethane moieties, preferably the moieties A and B nearest to any PO blocks are esters, A and B may be different or may be the same;

when the moieties A and B adjacent to the PO blocks are esters then it is preferred that p is not zero, alternatively, it is preferred that the ratio of (q1+q2):n is from 4 to 10 and that q2 is from 40 to 120;

G1 comprises 1,4 phenylene;

G2 is ethylene, which may be substituted;

It is preferred that moieties G2 are all ethylene of formula (IV)

(IV)

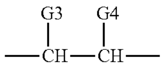

wherein G3 and G4 are selected from Hydrogen, C1-4 alkyl and C1-4 alkoxy, provided that at least one of G3 and G4 is not hydrogen and that at least 10% of the groups G2 have neither G3 nor G4 as hydrogen. Preferably when G3 and G4 are not hydrogen then they are methyl moieties. Preferably the non H substituents, more preferably the methyl moieties, are arranged in syn configuration on the ethylene backbone —CH—CH— of moieties G2.

Free Perfume

The compositions of the present invention comprises free perfume.

Free perfume may be present at a level selected from: less than 20%, less than 15%, and less than 10%, by weight of the composition. Free perfume may be present at a level selected from: more than 0.5%, more than 1%, and more than 2%, by weight of the composition. Suitably free perfume is present in the composition in an amount selected from the range of from about 0.5% to about 20%, preferably from about 1% to about 15%, more preferably from about 2% to about 10%, by weight of the garment refreshing composition.

Useful perfume components may include materials of both natural and synthetic origin. They include single compounds and mixtures. Specific examples of such components may be found in the current literature, e.g., in Fenaroli's Handbook of Flavor Ingredients, 1975, CRC Press; Synthetic Food Adjuncts, 1947 by M. B. Jacobs, edited by Van Nostrand; or Perfume and Flavor Chemicals by S. Arctander 1969, Montclair, N.J. (USA). These substances are well known to the person skilled in the art of perfuming, flavouring, and/or aromatizing consumer products.

A wide variety of chemicals are known for perfume use including materials such as aldehydes, ketones, esters and the like. More commonly, naturally occurring plant and animal oils and exudates comprising complex mixtures of various chemical components are known for use as perfume, and such materials can be used herein. Typical perfumes can comprise e.g. woody/earthy bases containing exotic materials such as sandalwood oil, civet and patchouli oil. The perfume also can be of a light floral fragrance e.g. rose or violet extract. Further the perfume can be formulated to provide desirable fruity odours e.g. lime, limon or orange.

Particular examples of useful perfume components and compositions are anetole, benzaldehyde, benzyl acetate, benzyl alcohol, benzyl formate, iso-bornyl acetate, camphene, cis-citral (neral), citronellal, citronellol, citronellyl acetate, paracymene, decanal, dihydrolinalool, dihydromyrcenol, dimethyl phenyl carbinol, eucalyptol, geranial, geraniol, geranyl acetate, geranyl nitrile, cis-3-hexenyl acetate, hydroxycitronellal, d-limonene, linalool, linalool oxide, linalyl acetate, linalyl propionate, methyl anthranilate, alpha-methyl ionone, methyl nonyl acetaldehyde, methyl phenyl carbinyl acetate, laevo-menthyl acetate, menthone, iso-menthone, myrcene, myrcenyl acetate, myrcenol, nerol, neryl acetate, nonyl acetate, phenyl ethyl alcohol, alpha-pinene, beta-pinene, gamma-terpinene, alpha-terpineol, beta-terpineol, terpinyl acetate, vertenex (para-tertiary-butyl cyclohexyl acetate), amyl cinnamic aldehyde, iso-amyl salicylate, beta-caryophyllene, cedrene, cinnamic alcohol, couramin, dimethyl benzyl carbinyl acetate, ethyl vanillin, eugenol, iso-eugenol, flor acetate, heliotrophine, 3-cis-hexenyl salicylate, hexyl salicylate, filial (para-tertiarybutyl-alpha-methyl hydrocinnamic aldehyde), gamma-methyl ionone, nerolidol, patchouli alcohol, phenyl hexanol, beta-selinene, trichloromethyl phenyl carbinyl acetate, triethyl citrate, vanillin, veratraldehyde, alpha-cedrene, beta-cedrene, C15H24sesquiterpenes, benzophenone, benzyl salicylate, ethylene brassylate, galaxolide (1,3,4,6,7,8-hexahydro-4,6,6,7,8,8,-hexamethyl-cyclo-penta-gamma-2-benzopyran), hexyl cinnamic aldehyde, lyral (4-(4-hydroxy-4-methyl pentyl)-3-cyclohexene-10-carboxaldehyde), methyl cedrylone, methyl dihydro jasmonate, methyl-beta-naphthyl ketone, musk ambrette, musk idanone, musk ketone, musk tibetine, musk xylol, aurantiol and phenylethyl phenyl acetate.

The free perfume compositions of the present compositions comprise blooming perfume ingredients. Blooming perfume components are defined by a boiling point less than 250° C. and a Log P or greater than 2.5. Preferably the free perfume compositions of the present invention comprise at least 10 w.t. % blooming perfume ingredients, more preferably at least 20 w.t. % blooming perfume ingredients, most preferably at least 25 w.t. % blooming perfume ingredients. Preferably the free perfume compositions of the present comprise less than 58 w.t. % blooming perfume ingredients, more preferably less than 50 w.t. % blooming perfume ingredients, most preferably less than 45 w.t. % blooming perfume ingredients. Suitably the free perfume compositions of the present compositions comprise 10 to 58 w.t. % blooming perfume ingredients, preferably 20 to 50 w.t. % blooming perfume ingredients, more preferably 25 to 45 w.t. % blooming perfume ingredients.

Examples of suitable blooming perfume ingredient include: Allo-ocimene, Allyl heptanoate, trans-Anethole, Benzyl butyrate, Camphene, Carvacrol, cis-3-Hexenyl tiglate, Citronellol, Citronellyl acetate, Citronellyl nitrile, Cyclohexylethyl acetate, Decyl Aldehyde (Capraldehyde), Dihydromyrcenol, Dihydromyrcenyl acetate, 3,7-Dimethyl-1-octanol, Fenchyl Acetate, Geranyl acetate, Geranyl formate, Geranyl nitrile, cis-3-Hexenyl isobutyrate, Hexyl Neopentanoate, Hexyl tiglate, alpha-Ionone, Isobornyl acetate, Isobutyl benzoate, Isononyl acetate, Isononyl alcohol, Isopulegyl acetate, Lauraldehyde, Linalyl acetate, Lorysia, D-limonene, Lymolene, (−)-L-Menthyl acetate, Methyl Chavicol (Estragole), Methyl n-nonly acetaldehyde, Methyl octyl acetaldehyde, Beta-Myrcene, Neryl acetate, Nonyl acetate, Nonaldehyde, Para-Cymene, alpha-Pinene, beta-Pinene, alpha-Terpinene, gamma-Terpinene, Terpineolene, alpha-Terpinyl acetate, Tetrahydrolinalool, Tetrahydromyrcenol, 2-Undecenal, Verdox (o-t-Butylcyclohexyl acetate), and Vertenex(4-tert.Butylcyclohexyl acetate).

Other useful perfume ingredients include substantive perfume components. Substantive perfume components are defined by a boiling point greater than 250° C. and a Log P greater than 2.5. Preferably the free perfume composition further comprises substantive perfume ingredients.

Boiling point is measured at standard pressure (760 mm Hg). Preferably a perfume composition will comprise a mixture of blooming and substantive perfume components. The perfume composition may comprise other perfume components.

The log P of many perfume ingredients have been reported; for example, the Pomona92 database, available from Daylight Chemical Information Systems, Inc. (Daylight CIS), Irvine, Calif., contains many, along with citations to the original literature. However, the log P values are most conveniently calculated by the "C LOG P" program, also available from Daylight CIS. This program also lists experimental log P values when they are available in the Pomona92 database. The "calculated log p" (C log P) is determined by the fragment approach of Hansch and Leo (cf., A Leo, in Comprehensive Medicinal Chemistry, Vol. 4, C. Hansch, P. G. Sammens, J. B. Taylor and C. A. Ramsden, Eds., p. 295, Pergamon Press, 1990, incorporated herein by reference). The fragment approach is based on the chemical structure of each perfume ingredient, and takes into account the numbers and types of atoms, the atom connectivity, and chemical bonding. The C log P values, which are the most reliable and widely used estimates for this physicochemical property, are used instead of the experimental log P values in the selection of perfume ingredients herein.

It is commonplace for a plurality of perfume components to be present in a free oil perfume composition. In the compositions for use in the present invention it is envisaged that there will be three or more, preferably four or more, more preferably five or more, most preferably six or more different perfume components. An upper limit of 300 perfume components may be applied.

The free perfume of the present invention is in the form of an emulsion. The particle size of the emulsion can be in the range from about 1 nm to 30 microns and preferably from about 100 nm to about 20 microns. The particle size is measured as a volume mean diameter, D[4,3], this can be measured using a Malvern Mastersizer 2000 from Malvern instruments.

Free oil perfume forms an emulsion in the present compositions. The emulsions may be formed outside of the composition or in situ. When formed in situ, at least one emulsifier is preferably added with the free oil perfume to stabilise the emulsion. Preferably the emulsifier is anionic or non-ionic. Examples suitable anionic emulsifiers for the free oil perfume are alkylarylsulphonates, e.g., sodium dodecylbenzene sulphonate, alkyl sulphates e.g., sodium lauryl sulphate, alkyl ether sulphates, e.g., sodium lauryl ether sulphate nEO, where n is from 1 to 20 alkylphenol ether sulphates, e.g., octylphenol ether sulphate nEO where n is from 1 to 20, and sulphosuccinates, e.g., sodium dioctylsulphosuccinate. Examples of suitable nonionic surfactants used as emulsifiers for the free oil perfume are alkylphenol ethoxylates, e.g., nonylphenol ethoxylate nEO, where n is from 1 to 50, alcohol ethoxylates, e.g., lauryl alcohol nEO, where n is from 1 to 50, ester ethoxylates, e.g., polyoxyethylene monostearate where the number of oxyethylene units is from 1 to 30 and PEG-40 hydrogenated castor oil. Any non-ionic surfactant included in the free perfume is counted in the overall non-ionic surfactant amount.

Encapsulated Perfume

The ancillary laundry composition of the present invention preferably comprise encapsulated perfumes. These may also be referred to as perfume microcapsules. The ancillary laundry compositions preferably comprise 0.1 to 20 wt. % perfume microcapsules, more preferably 0.5 to 12 wt. % perfume microcapsules, most preferably 1 to 8 wt. % perfume microcapsules. The weight of microcapsules is of the material as supplied.

When perfume components are encapsulated, suitable encapsulating materials, may comprise, but are not limited to; aminoplasts, proteins, polyurethanes, polyacrylates, polymethacrylates, polysaccharides, polyamides, polyolefins, gums, silicones, lipids, modified cellulose, polyphosphate, polystyrene, polyesters or combinations thereof. Particularly preferred materials are aminoplast microcapsules, such as melamine formaldehyde or urea formaldehyde microcapsules.

Perfume microcapsules of the present invention can be friable microcapsules and/or moisture activated microcapsules. By friable, it is meant that the perfume microcapsule will rupture when a force is exerted. By moisture activated, it is meant that the perfume is released in the presence of water. The ancillary laundry compositions of the present invention preferably comprises friable microcapsules. Moisture activated microcapsules may additionally be present. Examples of a microcapsules which can be friable include aminoplast microcapsules.

Perfume components contained in a microcapsule may comprise odiferous materials and/or pro-fragrance materials.

Particularly preferred perfume components contained in a microcapsule are blooming perfume components and substantive perfume components. Blooming perfume components are defined by a boiling point less than 250° C. and a Log P greater than 2.5.

Substantive perfume components are defined by a boiling point greater than 250° C. and a Log P greater than 2.5. Boiling point is measured at standard pressure (760 mm Hg). Preferably a perfume composition will comprise a mixture of blooming and substantive perfume components. The perfume composition may comprise other perfume components.

It is commonplace for a plurality of perfume components to be present in a microcapsule. In the compositions for use in the present invention it is envisaged that there will be three or more, preferably four or more, more preferably five or more, most preferably six or more different perfume components in a microcapsule. An upper limit of 300 perfume components may be applied.

The microcapsules may comprise perfume components and a carrier for the perfume ingredients, such as zeolites or cyclodextrins.

Non-Ionic Surfactant

The ancillary laundry compositions of the present invention preferably comprise less than 12 wt. %, more preferably less than 8 wt. % and most preferably less than 5 wt. % non-ionic surfactant. The ancillary laundry compositions of the present invention preferably comprise more than 0.5 wt. % non-ionic surfactant. Suitably, the ancillary laundry compositions of the present invention preferably comprise 0.5 to 12 wt. %, more preferably 0.5 to 8 wt. % and most preferably 0.5 to 5 wt. % non-ionic surfactant. The correct amount of non-ionic surfactant is important to achieve the desired delivery of the benefit agent. The ancillary laundry composition requires sufficient surfactant to carry the benefit agent, however too much surfactant will interfere with the action of the laundry liquid or powder with which it is used and will prevent release of the benefit agent due to insufficient dilution.

The non-ionic surfactants will preferably have an HLB value of 12 to 20, more preferably 14 to 18.

Examples of non-ionic surfactant materials include: ethoxylated materials, polyols such as polyhydric alcohols and polyol esters, alkyl polyglucosides, EO-PO block copolymers (Poloxamers). Preferably, the non-ionic surfactant is selected from ethoxylated materials. Preferred ethoxylated materials include: fatty acid ethoxylates, fatty amine ethoxylates, fatty alcohol ethoxylates, nonylphenol ethoxylates, alkyl phenol ethoxylate, amide ethoxylates, Sorbitan(ol) ester ethoxylates, glyceride ethoxylates (castor oil or hydrogenated castor oil ethoxylates) and mixtures thereof.

More preferably, the non-ionic surfactant is selected from ethoxylated surfactants having a general formula:

$$R_1O(R_2O)_xH$$

$R^1$=hydrophobic moiety.

$R^2$=$C_2H_4$ or mixture of $C_2H_4$ and $C_3H_6$ units x=4 to 120

R1 preferably comprises 8 to 25 carbon atoms and mixtures thereof, more preferably 10 to 20 carbon atoms and mixtures thereof most preferably 12 to 18 carbon atoms and mixtures thereof. Preferably, R is selected from the group consisting of primary, secondary and branched chain saturated and/or unsaturated hydrocarbon groups comprising an alcohol, carboxy or phenolic group. Preferably R is a natural or synthetic alcohol.

R2 preferably comprises at least 50% C2H4, more preferably 75% C2H4, most preferably R2 is C2H4.

x is preferably 8 to 90 and most preferably 10 to 60.

Examples of commercially available, suitable non-ionic surfactants include: Genapol C200 ex. Clariant and Eumulgin CO40 ex. BASF.

Other Surfactants

The ancillary laundry composition of the present invention is not a traditional laundry detergent or fabric conditioning composition. The present invention preferably comprises low levels or no anionic or cationic surfactant.

The liquid ancillary composition of the present invention preferably comprises less than 2 w.t. % anionic and cationic surfactant, more preferably less than 1 w.t. % surfactant, even more preferably less than 0.85 w.t. % anionic and cationic surfactant and most preferably less than 0.5 w.t. % anionic and cationic surfactant.

The composition can be completely free of anionic and cationic surfactants. In other words, the compositions preferably comprise 0 to 2 w.t.% anionic and cationic surfactant, more preferably, 0 to 1 w.t.% anionic and cationic surfactant, even more preferably 0 to 0.85 w.t. % and most preferably 0 to 0.5 w.t. % anionic and cationic surfactant. The composition can be completely free of anionic and cationic surfactant.

Structurants

If the ancillary laundry composition comprises microcapsules, a structurant may be required, non-limiting examples of suitable structurants include: pectine, alginate, arabinogalactan, carageenan, gellan gum, polysaccharides such as xanthum gum, guar gum, acrylates/acrylic polymers, water-swellable clays, fumed silicas, acrylate/aminoacrylate copolymers, and mixtures thereof.

Preferred dispersants herein include those selected from the group consisting of acrylate/acrylic polymers, gellan gum, fumed silicas, acrylate/aminoacrylate copolymers, water-swellable clays, polysaccharides such as xanthum gum and mixtures thereof. Most preferably the structurant is selected from polysaccharides such as xanthum gum, acrylate/acrylic polymers, acrylate/aminoacrylate copolymers, and water-swellable clays. Most preferred structurants are polysaccharides such as xanthum gum.

When present, a structurant is preferably present in an amount of 0.001-10 w.t. % percent, preferably from 0.005-5 w.t. %, more preferably 0.01-3 w.t. %.

Rheology Modifier

In some embodiments of the present invention, the ancillary laundry composition of the present invention may comprise rheology modifiers. These may be inorganic or organic, polymeric or non polymeric. A preferred type of rheology modifiers are salts.

Preservatives

The ancillary laundry composition of the present invention preferably comprises preservatives. Preservatives are preferably present in an amount of 0.001 to 1 wt. % of the composition. More Preferably 0.005 to 0.5 w.t %, most preferably 0.01 to 0.1 wt. % of the composition.

Preservatives can include anti-microbial agents such as isothiazolinone-based chemicals (in particular isothiazol-3-one biocides) or glutaraldehyde-based products. Examples of suitable preservatives include Benzisothiazoline, Cloromethyl-isothiazol-3-one, Methyl-isothiazol-3-one and mixtures thereof. Suitable preservatives are commercially available as Kathon CG ex. Dow and Proxel ex Lonza.

Other Ingredients

The ancillary laundry composition of the present invention may comprise further benefit agents. Examples of suitable further benefit agents include:

- silicone oils, resins, emulsions and modifications thereof such as linear and cyclic polydimethylsiloxanes, amino-modified, allcyl, aryl, and alkylaryl silicone oils
- malodour agents for example: uncomplexed cyclodextrin; odor blockers; reactive aldehydes; flavanoids; zeolites; activated carbon; and mixtures thereof
- dye transfer inhibitors
- shading dyes
- fluorescent agents/optical brighteners
- insect repellents
- organic sunscreen actives, for example, octylmethoxy cinnamate;
- antimicrobial agents, for example, 2-hydroxy-4,2,4-trichlorodiphenylether;
- ester solvents; for example, isopropyl myristate;
- anti redeposition agents
- lipids and lipid like substance, for example, cholesterol;
- hydrocarbons such as paraffins, petrolatum, and mineral oil
- fish and vegetable oils;
- hydrophobic plant extracts;
- waxes;
- pigments including inorganic compounds with hydrophobically-modified surface and/or dispersed in an oil or a hydrophobic liquid;
- sugar-esters, such as sucrose polyester (SPE);
- and combinations thereof.

Preferred further benefit agents may be selected from: silicones, malodour agents, dye transfer inhibitors, fluorescent agents/optical brighteners, shading dyes, anti-microbials.

Examples of suitable silicones for the present invention are fabric softening silicones.

Non-limiting examples of such silicones include:

- Non-functionalised silicones such as polydimethylsiloxane (PDMS),
- Functionalised silicones such as alkyl (or alkoxy) functionalised, alkylene oxide functionalised, amino functionalised, phenyl functionalised, hydroxy functionalised, polyether functionalised, acrylate functionalised, siliconhydride functionalised, carboxy functionalised, phosphate functionalised, sulphate functionalised, phosphonate functionalised, sulphonic functionalised, betaine functionalised, quarternized nitrogen functionalised and mixtures thereof.

Copolymers, graft co-polymers and block co-polymers with one or more different types of functional groups such as alkyl, alkylene oxide, amino, phenyl, hydroxy, polyether, acrylate, siliconhydride, carboxy, phosphate, sulphonic, phosphonate, betaine, quarternized nitrogen and mixtures thereof.

The products of the invention may further comprise other optional laundry ingredients known to the person skilled in the art, such as antifoams, insect, pH buffering agents, perfume carriers, hydrotropes, polyelectrolytes, anti-oxidants, dyes, colorants, sunscreens, anti-corrosion agents and sequestrants. The products of the invention may contain pearlisers and/or opacifiers.

Viscosity

The viscosity of the ancillary laundry composition is preferably 20-15000 mPa·s, more preferably 50 to 15000 mPa·s, most preferably 100 to 10000 mPa·s. This viscosity provides the benefit that the laundry liquid carries the ancillary laundry composition into the laundry process.

Throughout this specification viscosity measurements were carried out at 25° C., using a 4 cm diameter 2° cone and plate geometry on a DHR-2 rheometer ex. TA instruments.

In detail, all measurements were conducted using a TA-Instruments DHR-2 rheometer with a 4 cm diameter 2 degree angle cone and plate measuring system. The lower Peltier plate was used to control the temperature of the measurement to 25° C. The measurement protocol was a 'flow curve' where the applied shear stress is varied logarithmically from 0.01 Pa to 400 Pa with 10 measurement points per decade of stress. At each stress the shear strain rate is measured over the last 5 seconds of the 10 second period over which the stress is applied with the viscosity at that stress being calculated as the quotient of the shear stress and shear rate.

For those systems which exhibit a low shear viscosity plateau over large shear stress ranges, to at least 1 Pa, the characteristic viscosity is taken as being the viscosity at a shear stress of 0.3 Pa. For those systems where the viscosity response is shear thinning from low shear stress the characteristic viscosity is taken as being the viscosity at a shear rate of 21 s-1.

Preferably, the ancillary laundry composition floats on a, laundry liquid with which it is used. By float it is meant that the ancillary laundry composition will remain at the surface of the laundry liquid for a period of at least 5 minutes, preferably 10 minutes and most preferably at least 15 minutes. Floating provides the benefit the laundry liquid carries the ancillary laundry composition into the laundry process.

To enable the ancillary laundry composition to float, it is not essential that it is less dense than the laundry liquid with which it is being used, however it is preferred that the ancillary laundry composition is less dense than the laundry liquid with which it is used. This density provides the benefit the laundry liquid carries the ancillary laundry composition into the laundry process.

The ancillary laundry composition is preferably not miscible with a laundry liquid with which it is used. The in-admissibility prevents mixing of the ancillary laundry composition and laundry liquid and ensures maximum performance.

Method

The compositions of the present invention may be used in a method for improving perfume intensity of dry fabric or for reducing malodour of synthetic fabrics.

In one aspect of the present invention is a method of improving the perfume intensity of a dry fabric comprising the steps of:

a. adding the ancillary laundry composition of any preceding claim into the wash or rinse stage of the laundry process.

In a second aspect is a method of reducing malodour of synthetic fabrics comprising the steps of:

a. adding the ancillary laundry composition of any preceding claim into the wash or rinse stage of the laundry process.

Preferably, for either of the above methods, the ancillary laundry composition is added to the rinse stage of the washing process.

Preferably, for either of the above methods, the composition is used in addition a laundry detergent and/or a fabric conditioner.

A preferred method steps for either of the above methods include:

a. Pouring a laundry product into a washing receptacle, a washing machine drawer, or a dosing shuttle
b. Pouring a laundry serum composition according to any preceding claim on top of the laundry product.

By washing receptacle, it is meant any vessel in which washing is performed. This may be for example the drum of a front or top loading washing machine or a bowl/sink in which hand washing is performed. By drawer it as meant any one of the compartments in the washing machine drawer. By dosing ball is meant any form of container which would usually hold a laundry detergent composition and be placed directly in a washing machine. By laundry product it is meant a detergent or fabric conditioning composition.

Preferably a laundry product is poured into a washing machine drawer or a dosing ball, and then the ancillary laundry composition is poured on top of the laundry product in the drawer or dosing ball. Pouring the ancillary laundry composition on top of the laundry product provides the benefit that the laundry liquid carries the serum into the wash or rinse without mixing with the two compositions.

Alternatively, the ancillary laundry composition may be added to the wash separately to any other laundry products being used in the wash process. e.g. at a different stage, in a separate compartment of a washing machine drawer, in a separate dosing ball etc.

Preferably the ancillary laundry composition is added to the laundry process in a volume of 2-30 ml, most preferably 2-20 ml. This dose is typically used with a 4-8 kg load of fabric, preferably and 5-6 kg load of fabric.

Use

The compositions of the present invention may be used for two different purposes.

The compositions may be used to improve the perfume intensity on a dry fabric, without wishing to be bound by theory, it is understood that this is achieved by improved hedonics. Improved perfume intensity can be measured for example by consumers, smelling the garments and rating on a scale of 1 to 10 or using analytical apparatus such as Headspace Gas Chromatography Mass Spectroscopy.

Alternatively, the composition may be used to reduce malodour on synthetic fabrics, in particular polyester fabric.

Reduced malodour can be easily detected by the human nose, and can be assessed by a consumer panel.

Example Compositions

TABLE 1

Example compositions of the present invention

| Ingredient | 1 (wt. %) | 2 (wt. %) |
|---|---|---|
| Non-ionic surfactant [1] | 3 | 5 |
| Soil release polymer [2] | 7 | 3 |
| Free perfume | 10 | 8 |
| Encapsulated perfume | — | 4 |
| Water | To 100 | To 100 |

Non-ionic surfactant [1]—Eumulgin CO40 ex. BASF
Soil release polymer [2]—Texcare 260 ex. Clariant These compositions provide witness maintenance benefits to white fabrics.

The invention claimed is:

1. An ancillary laundry composition comprising:

a. soil release polymer;

b. 0.5 to 20 wt. % free perfume;

c. 0.5 to 5 wt. % non-ionic surfactant; and d. water wherein the composition is free of anionic and cationic surfactants.

2. The ancillary laundry composition according to claim 1, wherein the composition further comprises 0.1 to 20 wt. % encapsulated perfume.

3. The ancillary laundry composition according to claim 1, wherein the soil release polymer is selected from polymers according to the formula:

Formula (II)

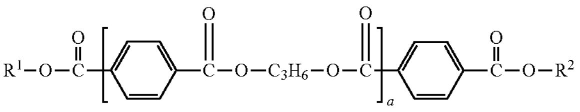

wherein:

$R^1$ and $R^2$ independently of one another are X—$(OC_2H_4)_n$—$(OC_3H_6)_m$;

X is $C_{1-4}$ alkyl;

the —$(OC_2H_4)$ groups and the —$(OC_3H_6)$ groups are arranged blockwise and the block consisting of the —$(OC_3H_6)$ groups is bound to a COO group or are HO—$(C_3H_6)$;

n is based on a molar average a number of from 12 to 120;

m is based on a molar average a number of from 1 to 10; and a is based on a molar average a number of from 4 to 9.

4. The ancillary laundry composition according to claim 1, wherein the non-ionic surfactant comprises ethoxylated non-ionic surfactant.

5. The ancillary laundry composition according to claim 1, wherein the composition further comprises a structurant.

6. The ancillary laundry composition according to claim 1, wherein the ancillary laundry composition has a viscosity of 20-15000 mPa·s.

* * * * *